A. & L. CHRONIK.
THREAD COUNTING APPARATUS.
APPLICATION FILED JUNE 19, 1908.
901,879.
Patented Oct. 20, 1908.
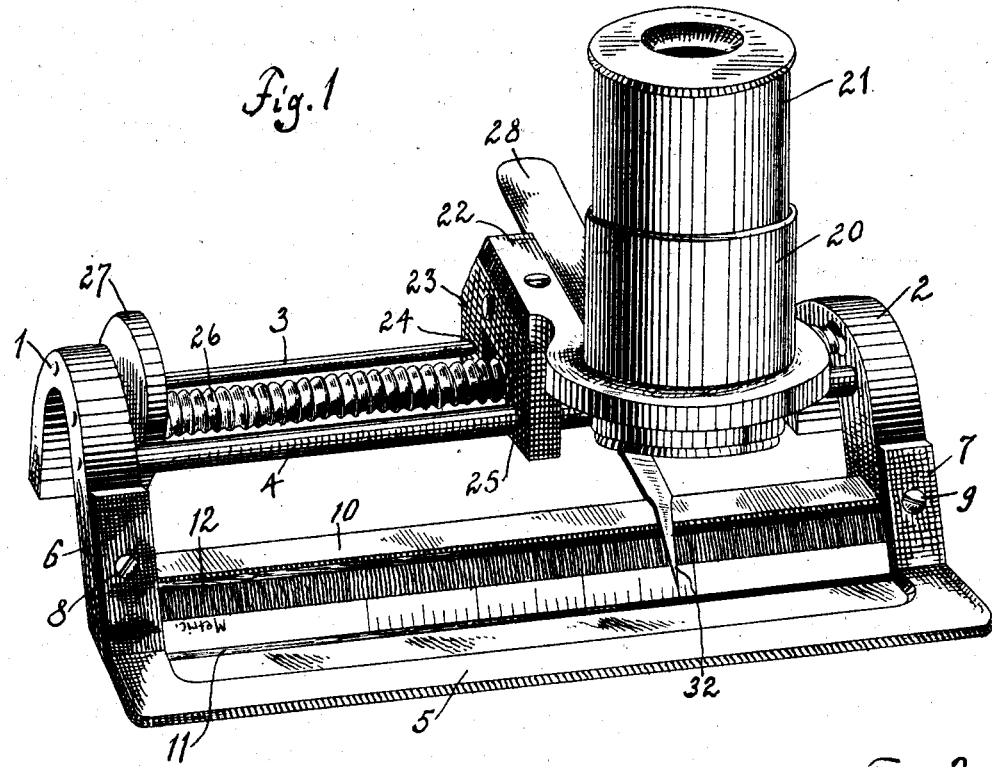
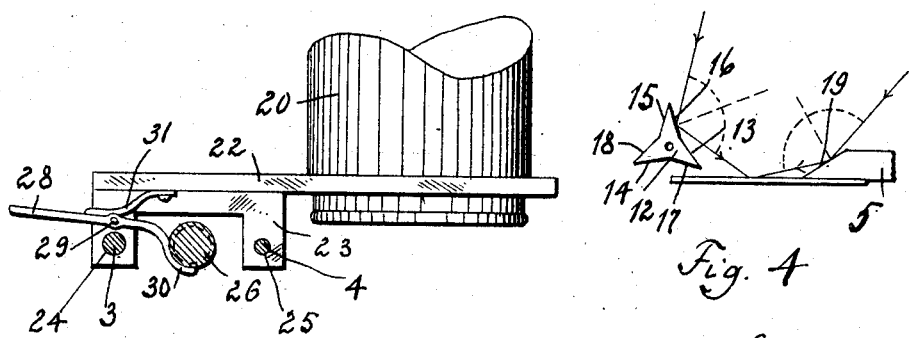
WITNESSES:
S. Birnbaum
Thos Veitch
August Chronik &
Louis Chronik
INVENTORS
BY Sigmund Herzog
their ATTORNEY
THE NORRIS PETERS CO., WASHINGTON, D. C.

UNITED STATES PATENT OFFICE.

AUGUST CHRONIK AND LOUIS CHRONIK, OF NEW YORK, N. Y.

THREAD-COUNTING APPARATUS.

No. 901,879.  Specification of Letters Patent.  Patented Oct. 20, 1908.

Application filed June 19, 1908. Serial No. 439,435.

*To all whom it may concern:*

Be it known that we, AUGUST CHRONIK and LOUIS CHRONIK, citizens of the United States, and residents of the city of New York, in the county of New York and State of New York, have invented certain new and useful Improvements in Thread - Counting Apparatus, of which the following is a specification.

The present invention relates to thread counting apparatus, and more particularly to a device of this character wherein the piece of fabric, the threads of a certain length of which are to be ascertained, is viewed by the observer through a magnifying glass.

The object of the invention is to provide a device of the character specified which is simple and durable in construction, and comprises means, whereby the fabric, the threads of which are to be examined, is brought to lie flat in a plane, so that any possible mistakes are avoided.

Another object of the invention is to provide a thread counting device which comprises a microscope provided with a pointer, which pointer is secured to and moves with said microscope and is located in the longitudinal axis of said microscope, and more particularly in the focus of the microscope.

A still further object of the invention is to provide a rotatable scale, graduated according to different systems, that is, for instance, according to the metric system, the English system, and the English system subdivided by the decimal system, whereby the threads of a piece of fabric may be easily counted for a given length in different systems.

A still further object of the invention is to provide a rotatable scale, which at the same time serves to illuminate the fabric which it is intended to examine.

Another object of the invention is to provide a connection between the microscope and the frame of the apparatus, which will allow to shift the microscope longitudinally upon the axis of the apparatus as the threads are counted, and will allow the microscope to be disengaged from the shifting means in order to bring the same in a quick and reliable manner to a given point of the scale, where the counting of the threads is to be started. This and other advantages will be apparent to the mechanic skilled in the art from reading the specification and from examining the accompanying drawings attached to this application.

The invention is illustrated in the accompanying drawings, in which

Figure 1 is a perspective view of the apparatus, Fig. 2 a perspective view of the triangular scale used in the same, Fig. 3 a detail of construction of the microscope shifting means, and Fig. 4 a diagrammatic view illustrating the mode of illuminating the fabric.

In the drawings, 1 and 2 denote the supports of the apparatus, being in this case U-shaped members, connected by tie-rods 3 and 4. These members carry a flat plate 5, the ends of which are bent upward at 6 and 7 and secured to the U-shaped members 1 and 2 by means of screws 8 and 9, respectively. To the front portion of the U-shaped members is furthermore secured a rod 10 of substantially quadratic cross section, and more particularly in such a manner that the lower surfaces of the U-shaped members, of the rod 10 and the flat member 5 are located in one plane. Between the rod 10 and flat member 5 is in this manner formed a space 11, so that in placing the instrument upon a piece of fabric, the instrument will rest flat upon the same and spread it, whereby the surface can be easily viewed through the aperture 11.

As mentioned hereinbefore, the threads of a certain length of fabric are to be counted. The unit of length is usually one English inch or a fraction of the same, which fraction may be a subdivision of the inch according to the English system or a subdivision of the inch according to the decimal system, or the length may be the unit of the metric system, that is the centimeter. Obviously three scales are therefore needed, that is, first, a scale graduated in English inches, subdivided according to the duodecimal system, second, a scale graduated according to the English decimal system, and, third, a metric scale. For this purpose the present invention provides a triangular scale 12, rotatably mounted upon the U-shaped members 1 and 2 in such a manner that the graduated planes are brought into or nearly into contact with the piece of fabric, the threads of which are to be counted. The triangular scale 12 differs from the triangular scales, heretofore in use, in that a part of its surface is used to reflect the incident rays of light upon the surface of the fabric examined. For this purpose the scale consists of six surfaces, of which the surfaces 13, 14 and 15 carry the graduations, while surfaces 16, 17 and 18 are ground and polished to form mirror-like surfaces which throw the light upon the fabric. In order that all parts of the fabric should be illuminated, the inner portion of the flat plate 5 is provided with an inclined mirror surface 19, reflecting the light upon the fabric. By this arrangement the entire surface of the fabric under observation is illuminated and no part of it will be in shadow.

In order to facilitate the counting of the threads of the fabric, the instrument is provided with a microscope 20 which is of the usual construction, that is it is provided with an object glass and draw-tube 21 for focusing. The microscope is mounted on a bracket 22, which in turn is fixedly secured to supporting frames 23, the holes 24 and 25 of which are engaged by the guide rods 3 and 4, respectively, whereby the microscope may be shifted longitudinally on the apparatus. The shifting means comprise, more particularly a screw bolt 26, rotatably mounted in the U-shaped members 1 and 2 and carrying a knob 27, to facilitate the rotation of the same. The connection between the screw bolt 26 and the microscope is made by means of a lever 28, fulcrumed at 29 on one of the supporting frames 23, and provided with a segmental nut 30, engaging normally the screw bolt 26. The segmental nut 30 is kept in engagement with the screw bolt by means of a flat spring 31, secured to the bracket 22 and engaging the lever 28.

To facilitate the counting of the threads, a pointer 32 is provided, and more particularly the same is located in the longitudinal axis of the microscope in such a way that its point contacts with the scale. This pointer is fixedly secured to the microscope and moves with the same.

The operation of the device is as follows: The fabric to be examined is placed upon the table, and the instrument placed upon the same in such a manner that the threads to be counted are located at substantially right angles to the longitudinal axis of the apparatus. Obviously, first that of the scales, which it is desired to take as a unit, is to be brought into its proper position. The draw-tube 21 of the microscope is now operated, whereby the fabric is focused. The microscope and the pointer is brought now to the starting point of the scale by pulling the lever 28 upwards, whereby the nut and screw are disengaged, allowing thus the microscope to be shifted and to be brought quickly to the starting point or as nearly as possible to the same. When now the knob 27 is turned, the pointer may be brought to coincide exactly with the starting point of the scale, and in continuing the rotation of the knob, the threads are counted in an easy and quick manner.

It will be easily seen that the screw bolt 26 should be provided with micrometric screw-threads, so that it may be adapted for the examination of very fine fabrics.

It will be easily seen that various minor changes may be made in the construction and arrangement of the parts without departing from the spirit and scope of the present invention.

What we claim is:

1. In an instrument for counting picks or threads in fabrics, the combination with a supporting frame adapted to rest flat on the fabric and having an aperture through which the threads of said fabric may be counted, of a microscope carried by said frame and adapted to move in a plane parallel to the plane of the fabric, a pointer secured to and moving with said microscope, and a scale mounted upon said frame adjoining said aperture.

2. In an instrument for counting picks or threads in fabrics, the combination with a supporting frame adapted to rest flat on the fabric and having an aperture through which the threads of said fabric may be counted, of a microscope mounted upon said frame and adapted to move in a plane paralled to the plane of the fabric, a pointer located in the longitudinal axis of and moving with said microscope, and a scale mounted upon said frame adjoining said aperture.

3. In an instrument for counting picks or threads in fabrics, the combination with a supporting frame adapted to rest flat on the fabric and having an aperture through which the threads of said fabric may be counted, of a microscope mounted upon said frame and adapted to move in a plane parallel to the plane of the fabric, a pointer secured to and moving with said microscope, and a triangular scale rotatably mounted upon said frame adjoining said aperture.

4. In an instrument for counting picks or threads in fabrics, the combination with a supporting frame adapted to rest flat on the fabric and having an aperture through which the threads of said fabric may be counted, of a microscope mounted upon said frame and adapted to move in a plane paralled to the plane of the fabric, a pointer secured to and moving with said microscope, a triangular scale rotatably mounted upon said frame adjoining said aperture, means on said frame for illuminating the fabric being examined, and means on said scale for illuminating the surface of the fabric being viewed.

5. In an instrument for counting picks or threads in fabrics, the combination with a supporting frame adapted to rest flat on the fabric and having an aperture through which the threads of said fabric may be counted, of a microscope movably supported by said frame, a pointer in the longitudinal axis of said microscope and adapted to move with said microscope in a plane parallel to the plane of the fabric, a scale mounted upon said frame adjoining said aperture, and means for imparting movement to said microscope and the pointer secured thereto.

6. In an instrument for counting picks or threads in fabrics, the combination with a supporting frame adapted to rest flat on the fabric and having an aperture through which the threads of said fabric may be counted, of a microscope movably supported by said frame, a pointer in the longitudinal axis of said microscope and adapted to move therewith in a plane parallel to the plane of the fabric, and means having a screw threaded engagement with said microscope and adapted to impart movement to the same and said pointer.

7. In an instrument for counting picks or threads in fabrics, the combination with a supporting frame adapted to rest flat on the fabric and having an aperture through which the threads of said fabric may be counted, of a micrometer screw rotatably mounted on said frame, a microscope having a screw-threaded engagement with said screw, a pointer secured to and moving with said microscope in a plane parallel to the plane of said fabric, a scale mounted upon said frame adjoining said aperture, means for rotating said screw whereby said microscope is moved longitudinally.

8. In an instrument for counting picks or threads in fabrics, the combination with a supporting frame adapted to rest flat on the fabric and having an aperture through which the threads of said fabric may be counted, of a micrometer screw rotatably mounted on said frame, a microscope having a screw-threaded engagement with said screw, a pointer secured to and moving with said microscope, a scale mounted on said frame adjoining said aperture, means for rotating said screw whereby said microscope is moved longitudinally, and means for disengaging said microscope with said screw.

9. In an instrument for counting picks or threads in fabrics, the combination with a supporting frame adapted to rest flat on the fabric and having an aperture through which the threads of said fabric may be counted, of a micrometer screw rotatably mounted on said frame, a microscope slidably mounted on said frame, and a nut on said microscope in engagement with said screw, a pointer secured to and moving with said microscope, a scale mounted upon said frame adjoining said aperture, and means for rotating said screw for imparting longitudinal movement to said microscope.

10. In an instrument for counting picks or threads in fabrics, the combination with a supporting frame adapted to rest flat on the fabric and having an aperture through which the threads of said fabric may be counted, of a micrometer screw rotatably mounted on said frame, a microscope having a screw-threaded engagement with said screw, a pointer secured to and moving with said microscope, a scale mounted upon said frame adjoining said aperture, means on said screw for imparting longitudinal movement to said microscope, and means for disengaging said microscope from said screw.

11. In an instrument for counting picks or threads in fabrics, the combination with a supporting frame adapted to rest flat on the fabric and having an aperture through which the threads of said fabric may be counted, of a microscope carried by said frame and adapted to move in a plane parallel to the plane of the fabric, a pointer secured to and moving with said microscope, and a triangular scale rotatably mounted upon said frame adjoining said aperture, and means for illuminating the surface of the fabric being examined.

Signed at New York, in the county of New York and State of New York, this 18th day of June, A. D. 1908.

AUGUST CHRONIK.
LOUIS CHRONIK.

Witnesses:
SIGMUND HERZOG,
P. V. SULLIVAN.